United States Patent [19]

Morigami

[11] Patent Number: 5,778,109
[45] Date of Patent: Jul. 7, 1998

[54] IMAGE PROCESSING APPARATUS

[75] Inventor: Masanori Morigami, Nara, Japan

[73] Assignee: Sharp Kabushiki Kaisha, Osaka, Japan

[21] Appl. No.: 725,309

[22] Filed: Oct. 2, 1996

[30] Foreign Application Priority Data

Oct. 6, 1995 [JP] Japan .................... 7-260524

[51] Int. Cl.$^6$ .................................. G06K 9/40
[52] U.S. Cl. .................. 382/274; 382/312; 358/461; 358/487; 348/251
[58] Field of Search ....................... 382/312, 270, 382/274; 356/71; 358/518, 461, 487; 399/32, 366; 348/251; 347/15, 19, 49

[56] References Cited

U.S. PATENT DOCUMENTS

| | | | |
|---|---|---|---|
| 4,633,314 | 12/1986 | Kurata et al. | 348/251 |
| 5,457,547 | 10/1995 | Yamada | 358/487 |
| 5,471,281 | 11/1995 | Hayashi et al. | 356/71 |
| 5,617,187 | 4/1997 | Hayashi et al. | 399/32 |
| 5,712,666 | 1/1998 | Matsubara et al. | 347/19 |

FOREIGN PATENT DOCUMENTS

| | | | |
|---|---|---|---|
| 4-217170 | of 1992 | Japan | H04N 1/40 |
| 406205300 | 7/1994 | Japan | H04N 1/40 |

Primary Examiner—Jose L. Couso
Assistant Examiner—Anh Hong Do
Attorney, Agent, or Firm—Nixon & Vanderhye, PC

[57] ABSTRACT

An image processing apparatus is furnished with (1) a tabletop main body, (2) a readout scanner, attachable to and detachable from the main body, for outputting readout image data, (3) a portable memory pack, attachable to and detachable from the scanner, for storing image data from the scanner, and (4) a control section for, when the portable memory pack and main body are connected to each other, controlling the main body and memory pack in such a manner that the latest first correction data stored in the main body are transmitted to the memory pack to update second correction data stored in the memory pack, so that the image data in the pack memory are corrected based on the updated second correction data. Thus, the portable memory pack of the present image processing apparatus obviates measuring means for measuring correction data, and therefore, can be downsized.

19 Claims, 10 Drawing Sheets

ABSTRACT FIG.

IMAGE PROCESSING APPARATUS

FIELD OF THE INVENTION

The present invention relates to an image processing apparatus, such as a copying machine, capable of outputting an image in optimum conditions.

BACKGROUND OF THE INVENTION

An image processing apparatus, such as a facsimile machine and a copying machine, furnished with a readout scanner comprising a CCD (Charge Coupled Device) array for reading an image on a document or the like and outputting corresponding image data is known. Such an image processing apparatus uses a lens to form an image on the CCD array to read out the image, which causes shading distortion on the resulting image.

To solve this problem, the above image processing apparatus further includes a correcting circuit and a correction memory. The correcting circuit carries out distortion correcting operation for correcting the shading distortion on the image data from the readout scanner (which is referred to as shading correcting operation, hereinafter). The correction memory stores data necessary for the shading correcting operation (which are referred to as the shading correction data, hereinafter).

The above image processing apparatus further includes a RAM (Random Access Memory) as storage means for storing the image data corrected based on the shading correction data to output the corrected image data via telephone lines or the like or print out the same by a printer or the like.

In the shading correcting operation, the readout scanner reads a white document as the reference document in the first place to store the image data of white level into the correction memory as the shading correction data. Then, the readout scanner reads a normal document or the like, and the readout image data are normalized (divided) by the shading correction data. As a result, the corrected image data in which the shading distortion is corrected are obtained.

Incidentally, a separable image processing apparatus is also known, and an example facsimile machine is disclosed in Japanese Laid-Open Patent Application No. 217170 (1992). More specifically, this type of facsimile machine comprises a tabletop facsimile main body and a readout scanner serving as a document readout device which is detachable from and attachable to the facsimile main body. When the document readout device is detached from the facsimile main body, electrical connection therebetween is established by means of a cord. This arrangement enables the facsimile machine to read out an image on a document some distance away from the facsimile machine main body.

The shading correction data are updated each time a document is set when the document readout device is attached to the facsimile main body, so that the latest shading correction data are stored in the correction memory. Therefore, even when the document readout device is detached from the facsimile main body, the document readout device can carry out the shading correcting operation based on the latest shading correction data.

This arrangement can ensure the shading correction whether the document readout device is attached to or detached from the facsimile main body.

However, it is a cord (wire) that connects the document readout device to the facsimile main body. Therefore, the length of the cord limits an area where the document readout device can operate when detached from the facsimile main body.

To eliminate this problem, a more versatile image processing apparatus omitting the cord and furnished with a portable read-only device for storing the image data read by the readout scanner (the document readout device) is proposed.

More specifically, the above portable read-only device for storing the image data read by the readout scanner is detachable from and attachable to the readout scanner serving as the document readout device which is also portable and detachable from and attachable to the facsimile main body.

With this type of image processing apparatus, the read-only device is connected to the facsimile main body after it has stored the image data to transfer the image data to the facsimile main body, so that the facsimile main body can output the image data through its own printer or to an external device through an output section of transmitting means or the like.

Figure 11:
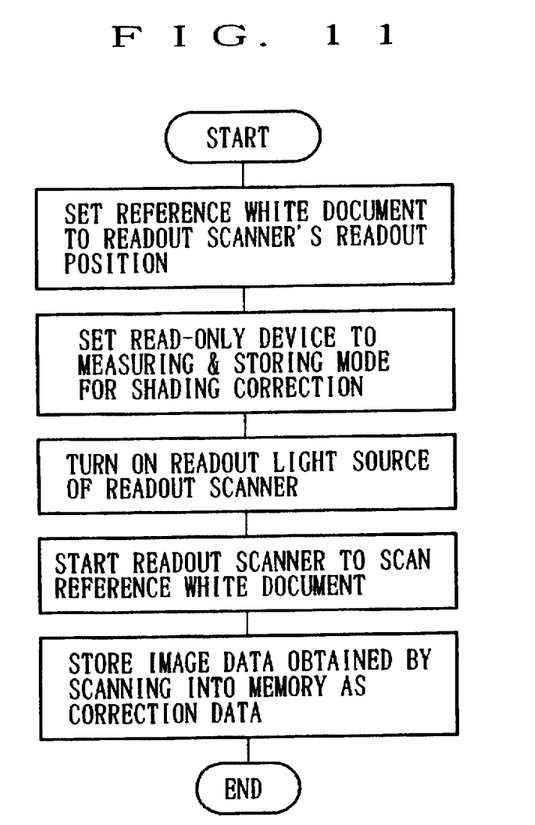
FIG. 11 is a flowchart detailing a procedure for storing shading correction data into a read-only device of a conventional image processing apparatus.

The read-only device can be made compatible with a plurality of image processing apparatuses to be more versatile. However, since the shading correcting operation is carried out by each readout scanner, each time the read-only device is attached to a different readout scanner, the readout scanner and read-only device measure the shading correction data using the white document as the reference document and store the same for the shading correction (see the flowchart in FIG. 11).

Thus, the shading correcting operation becomes tedious and takes quite a long time. Moreover, since the portable read-only device must include additional members, such as a control circuit for computing the shading correction data, the size thereof is undesirably increased.

SUMMARY OF THE INVENTION

It is therefore an object of the present invention to provide an image processing apparatus furnished with a portable compact read-only device capable of simplifying the shading correcting operation for image data.

To fulfill the above object, an image processing apparatus of the present invention is furnished with:

a scanner for converting an image into image data;

a main body having a first memory, the scanner being attachable to and detachable from the main body, the first memory storing first shading correction data for correcting distortion of the image data from the scanner;

a portable memory pack having a second memory, the scanner being attachable to and detachable from the memory pack, the second memory storing second shading correction data for correcting distortion of the image data from the scanner; and a control section for controlling the main body and the memory pack in such a manner that, when the main body and the memory pack are connected to each other, the main body sends the first shading correction data to the memory pack to update the second shading correction data using the first shading correction data.

According to the above arrangement, in a case where the scanner is detached from the main body and connected to the memory pack, connecting the main body and memory pack makes is possible to send the first shading correction data as to the scanner to the memory pack under the control of the control section, so that the second shading correction data in the second memory are updated.

Thus, the memory pack does not have to measure the second shading correction data and store the same in the second memory in advance to correct distortion on the image data peculiar to the scanner that converted the image into the image data.

Therefore, the memory pack can omit members for measuring the second shading correction data when the scanner is attached thereto, and reduce the time and labor for the control on the storage of the second shading correction data. Thus, the second shading correction data can be stored in a simpler procedure and the memory pack can be downsized.

In the above image processing apparatus, the control section may, when the main body and the memory pack are connected to each other, control the main body and the memory pack in such a manner that the memory pack sends the second shading correction data to the main body to be compared with the first shading correction data, the second shading correction data being updated only when the first and second shading correction data are different from to each other.

According to the above arrangement, the second shading correction data are updated only when the first and second shading data do not match, or are different. Thus, the control section need not update the second shading correction data when the first and second shading data match. As a result, when the main body and memory pack are connected to each other, the two components can speed up the start-up operation, and hence the initial operation.

In the above image processing apparatus, the main body may have a first computing section for computing a first data sum value by adding up the first shading correction data;

the memory pack may have a second computing section for computing a second data sum value by adding up the second shading correction data; and the control section may, when the main body and the memory pack are connected to each other, control the main body and the memory pack in such a manner that the memory pack sends the second data sum value to the main body to be compared with the first data sum value, the second shading correction data being updated only when the first and second data sum values are different from each other.

According to the above arrangement, the first data sum value and second data sum value are used when the first and second shading correction data are compared. This arrangement reduces an amount of data transmitted for the comparing operation and the data transmission time for the update operation, thereby speeding up the update of the second shading correction data.

The above image processing apparatus may further be furnished with a transfer counter for counting and storing the number of times the first shading correction data have been transferred from the main body to the memory pack, so that the control section, when the main body and the memory pack are connected to each other, controls the main body and memory pack in such a manner that the main body sends the first shading correction data to the memory pack based on the number of transfer times to update the second shading correction data using the first shading correction data.

According to the above arrangement, the control section judges whether the second shading correction data should be updated or not based on the number of transfer times of the first shading correction data in the transfer counter.

For example, the control section judges that the first shading correction data have been already transferred when the number of transfer times is 1, and otherwise when the number of transfer times is 0. The first shading correction data are sent to the memory pack when the first shading correction data have not been transferred to update the second shading correction data.

When the first shading correction data have been transferred, the transfer counter is set to 1 to stop the main body from sending the first shading correction data to the memory pack thereafter.

Therefore, according to the above arrangement, the second shading correction data are updated only when the first shading correction data have not been transferred to the memory pack yet. Thus, the control section need not repeat updating the second shading correction data. As a result, the main body and memory pack can reduce the start-up time when connected to each other.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 10, the following description will describe an example embodiment of the present invention.

Figure 1:
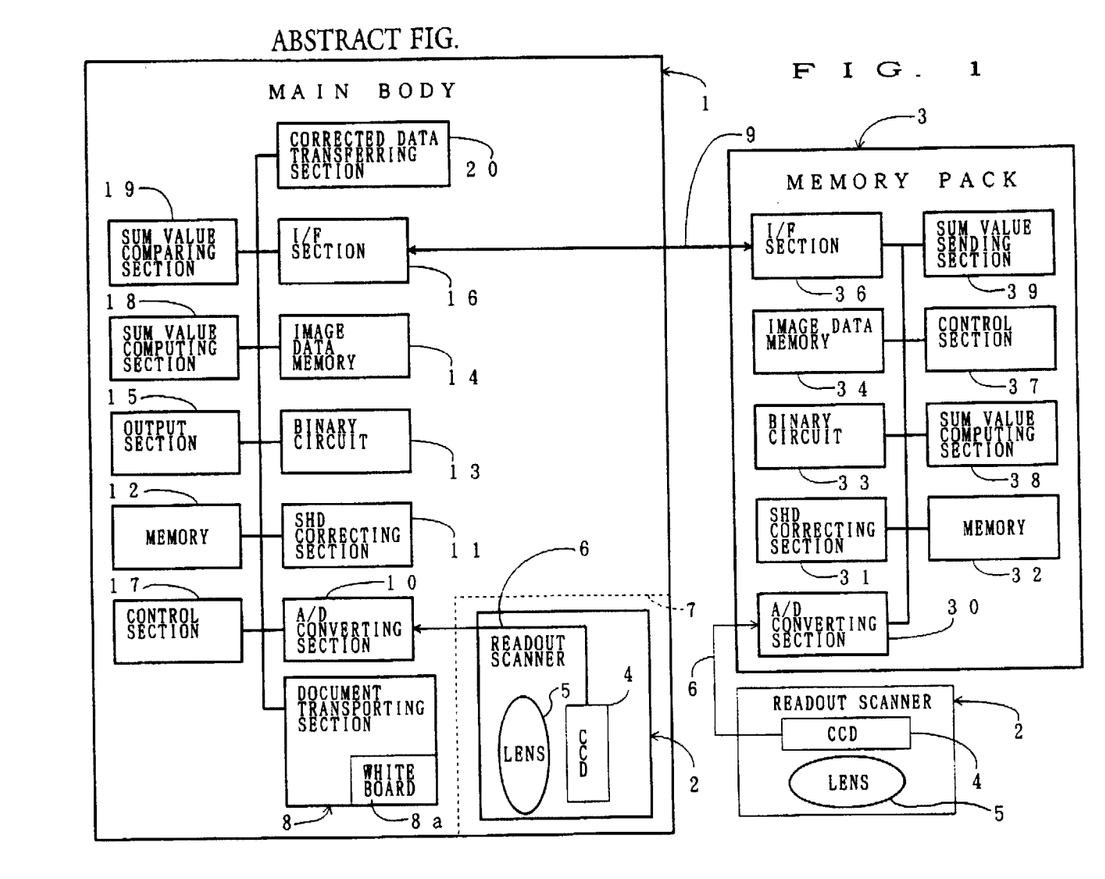
FIG. 1 is a block diagram depicting an image processing apparatus of the present invention.

An image processing apparatus of the present invention includes a facsimile machine, a copying machine, etc., and as shown in FIG. 1, the image processing apparatus includes a main body 1 for outputting image data to a printer or the like for a print-out operation or to an external device via a telephone line or the like.

The image processing apparatus also includes a readout scanner 2 which is detachable from and attachable to the main body 1. The readout scanner 2 reads an image and outputs the corresponding image data to the main body 1. Note that the readout scanner 2 is handy-sized and light in weight, so that it is easy to carry when detached from the main body 1.

The image processing apparatus further includes a memory pack 3 which is detachable from and attachable to the readout scanner 2. The memory pack 3 drives the readout scanner 2 when the scanner 2 is detached from the main body 1 and attached to the memory pack 3, and stores the image data from the readout scanner 2 to transfer the image data to the main body 1 when connected to the main body 1. Note that the memory pack 3 is also handy-sized and light in weight, so that it is easy to carry even when the readout scanner 2 is attached to the memory pack 3.

The readout scanner 2 includes a CCD section 4 composed of a linear array of CCD's (Charge Coupled Devices) for receiving the image in the form of light and converting the image into the image data for an output operation, and a lens section 5 composed of optical lenses for focusing light to form the image on the CCD section 4. The readout scanner 2 also includes a communication cable 6 which is connected to either the main body 1 or memory pack 3 to enable the image data transmission to the main body 1 either directly or by means of the memory pack 3.

Although it is not illustrated in the drawing, the readout scanner 2 also includes a light source for emitting light evenly to a document. More specifically, the light source is composed of a straight cathode ray tube or a light emitting diode element placed substantially parallel to the CCD section 4.

It is not illustrated in the drawing either, but the readout scanner 2 further includes a pair of cylindrical rollers, so that the user can slide the readout scanner 2 across a document manually to scan the document. To be more precise, the pair of rollers are provided in such a manner that the axis of rotation is parallel to the CCD section 4 in the longitudinal direction and each roller is positioned near the two opposing ends of the CCD section 4 in the longitudinal direction, respectively. Each roller includes an unillustrated detecting section for detecting its rotational angle and outputting a synchronizing signal, based on which the CCD section 4 scans the image.

That is to say, these rollers enable the user to slide the readout scanner 2 across the document while he maintains the CCD section 4 perpendicular to the document in the scanning direction. At the same time, these rollers enable the CCD section 4 to scan the document by outputting the synchronizing signal from each detecting section as the readout scanner 2 slides along. As a result, the readout scanner 2 can convert the image on the document into the image data in a precise manner.

The main body 1 includes a scanner attaching section 7 where the readout scanner 2 is detached from and attached to the main body 1. The main body 1 also includes a document transporting section 8 near the readout scanner 2 for steadily transporting the documents to the readout scanner 2 when the readout scanner 2 is attached to the main body at the scanner attaching section 7. The document transporting section 8 includes a white board 8a in a position opposing a photo-receiving section of the readout scanner 2, and the white board 8a is used as a reference document in the shading correction, which will be described below.

The main body 1 further includes the following components to output the image data from the readout scanner 2: an A/D converting section 10, a shading correcting section (first correcting section) 11 (hereinafter, referred to as the SHD correcting section 11), a memory (first memory) 12, a binary circuit 13, an image data memory 14, an output section 15, an I/F section 16, and a control section (control means) 17. Although it is not illustrated in the drawing, the main body 1 additionally includes a scanner driving section for driving the readout scanner 2 by supplying a power source and control signals.

More specifically, the A/D converting section 10 converts analog image data from the CCD section 4 into digital image data and outputs the same to the SHD correcting section 11. The SHD correcting section 11 corrects the shading distortion on the above digital image data caused by the lens section 5 of the readout scanner 2.

The memory 12 is a memory for storing the first shading correction data used in the above correcting operation. An amount of the first shading correction data is, for example, about 2K byte when the CCD section 4 is composed of 2048 pixels and digital image data of each pixel are 8 bits.

The binary circuit 13 is a circuit for converting the above corrected digital image data into binary data for the print-out operation by a facsimile machine or thermal printer. Note that the binary circuit 13 can be omitted when the digital image data are directly outputted to an external device. The image data memory 14 is a memory for storing the binary data or digital image data.

The output section 15 outputs the digital image data or binary data to an external device via telephone lines or to the thermal printer or the like for the print-out operation. The I/F section 16 is a connecting means for converting the image data and control signal in the form of parallel data into serial data to transmit the same between the main body 1 and the memory pack 3 through a communication cable 9. Note that the communication cable 9 constitutes an integral part of the connecting means.

The control section 17 controls the foregoing members 10 through 16, and is composed of, for example, a microcomputer and a memory or the like into which a program for controlling the microcomputer to manipulate the functions of the main body 1 is preinstalled.

Likewise, the memory pack 3 includes an A/D converting section 30, an SHD correcting section (second correcting section) 31, a memory (second memory) 32 for storing second shading correction data, a binary circuit 33, an image data memory (third memory) 34, an I/F section (connecting means) 36, a control section 37, and an unillustrated scanner driving section. Each of the foregoing members operates in the same manner as their respective counterparts in the main body 1 to store the image data from the readout scanner 2. The image data memory 34 is, for example, a flash memory large enough to store approximately a 30-page document of Japanese standard A4-size papers.

The main body 1 also includes a sum value computing section 18 for computing a first data sum value by adding up all the first shading correction data stored in the memory 12 at a request signal from the control section 17.

Likewise, the memory pack 3 includes a sum value computing section 38 for computing a second data sum value by adding up all the second shading correction data stored in the memory 32 at a request signal from the control section 17 of the main body 1. The memory pack 3 also includes a sum value sending section 39 for sending the second data sum value to the main body 1 through the I/F section 36.

The main body 1 further includes a sum value comparing section 19 and a corrected data transferring section 20. The sum value comparing section 19 compares the second data sum value from the memory pack 3 with the first data sum value from the sum value computing section 18 to check if the two values match or not, and the corrected data transferring section 20 transfers the first shading correction data stored in the memory 12 to the memory pack 3 when the two values do not match.

For further understanding, the A/D converting sections 10 and 30, SHD correcting sections 11 and 31, binary circuits 13 and 33, output units 15, and I/F sections 16 and 36 will be detailed in the following with reference to FIGS. 2 through 8.

Figure 2:
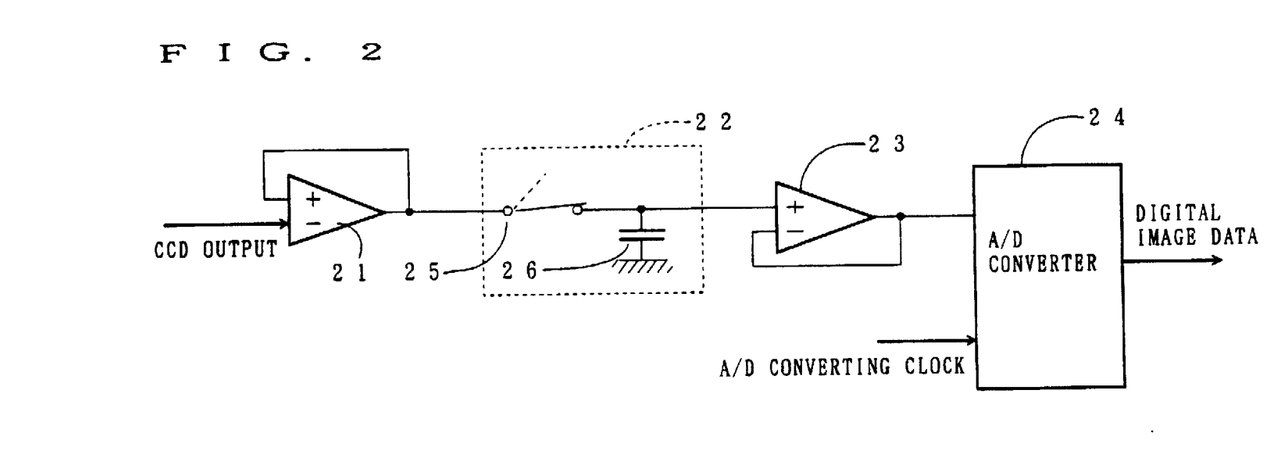
FIG. 2 is a block diagram depicting an A/D converting section of the above image processing apparatus.

As shown in FIG. 2, each of the A/D converting sections 10 and 30 includes a buffer amplifier 21 into which an output signal, or the analog image data, from the CCD section 4 of the readout scanner 2 is inputted, and a sampling circuit 22 into which a signal from the buffer amplifier 21 is inputted. Note that the sampling circuit 22 removes switching noise contained in the analog image data from the CCD section 4.

Each of the A/D converting sections 10 and 30 further includes a buffer amplifier 23 into which a signal from the sampling circuit 22 is inputted, and an A/D converter 24 for converting an analog signal from the buffer amplifier 23 into multivalued (digital) data, namely, digital image output, to output the same to the SHD correcting section 11. In each block diagram in FIG. 2 and beyond, a black point indicates an electrical connection between the two intersecting lines.

Each of the buffer amplifiers 21 and 23 is an operation amplifier, and an output therefrom is fed back to either input of its own, so that the gain is fixed to 1 to lower the output impedance to stabilize the operation of the sampling circuit 22 and A/D converter 24 in the latter stage.

The sampling circuit 22 includes an analog switch 25 for controlling the supply of the analog image data from the CCD section 4 based on a sampling clock, and a capacitor 26 for storing charges while the analog switch 25 stays ON. The sampling clock is generated based on a driving clock of the CCD section 4.

In the sampling circuit 22 thus structured, the analog switch 25 comes ON or goes OFF based on the sampling clock, and according to which the sampling of an effective output portion of the analog image data from the CCD section 4 of the readout scanner 2 is carried out to remove the switching noise contained in the analog image data.

Figure 3:
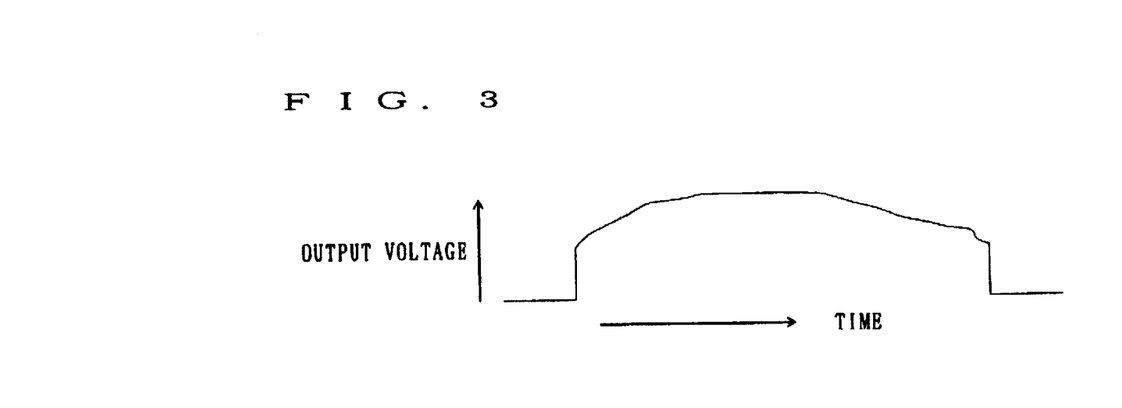
FIG. 3 is a graph showing shading distortion caused by the above image processing apparatus.

Each of the SHD correcting sections 11 and 31 corrects the shading distortion caused by the optical system. The shading distortion is the darkening around the top and end portions of each scanning line when the readout scanner 2 scans the white board 8a as the reference document. The shading distortion is caused by the semi-cylindrical distortion of the output voltage from the CCD section 4 while one line is scanned as shown in FIG. 3 due to irregular luminance of the light source of the readout scanner 2, irregular sensitivity of the CCD section 4, and limb darkening by the lens section 5 according to the $\cos^4\theta$ rule.

Figure 4:
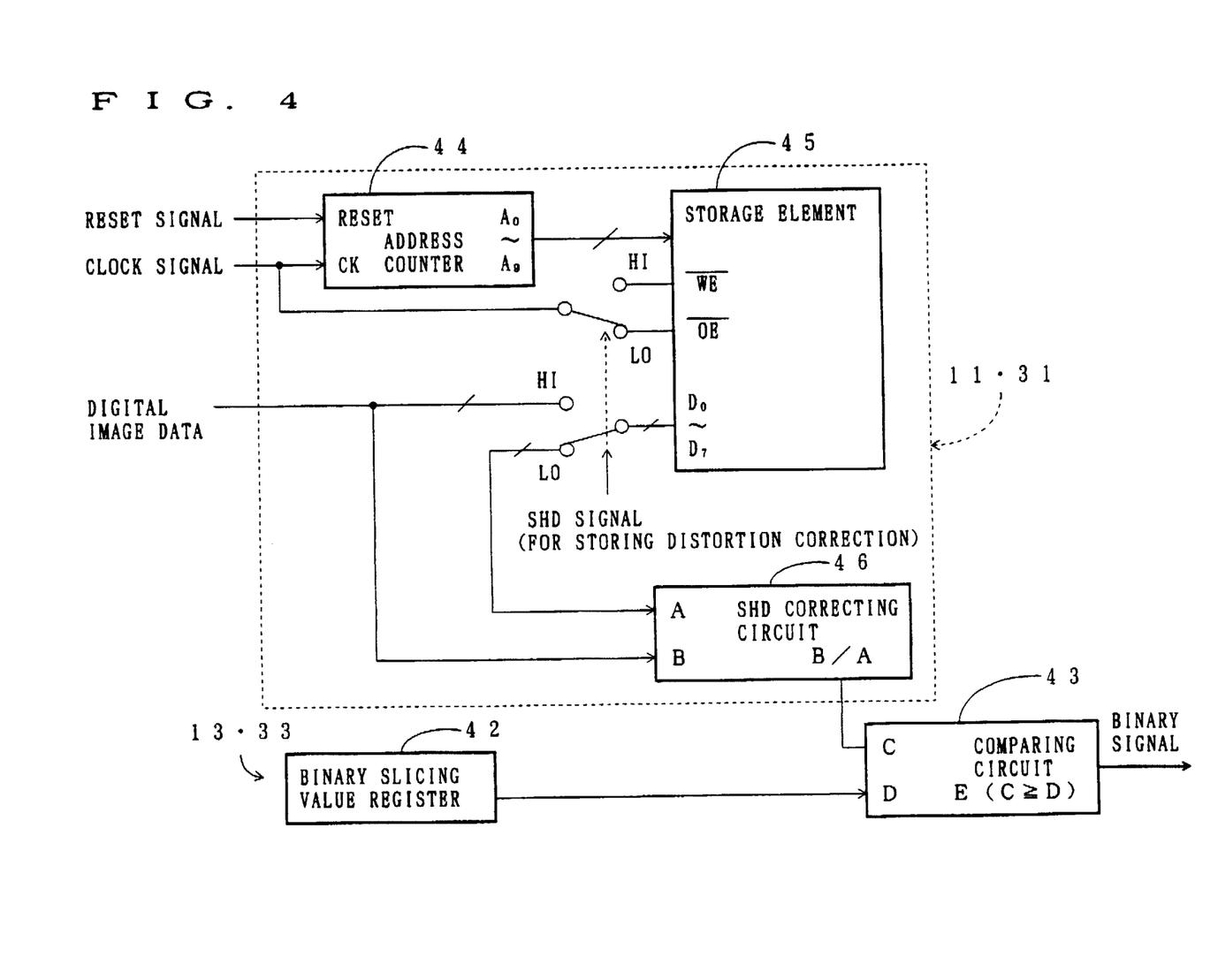
FIG. 4 is a block diagram depicting an SHD (SHading Distortion) correcting section and a binary circuit of the above image processing apparatus.

As shown in FIG. 4, each of the SHD correcting sections 11 and 31 includes an address counter 44 and a storage element 45, such as a RAM. The address counter 44 counts an address for the shading distortion correction and outputs the same to the storage element 45. The storage element 45 stores the irregularity of the optical system measured in advance using the reference document, namely the white board 8a, as the shading correction data at the addresses sent from the address counter 44 to enable the shading correction on the digital image output.

Further, each of the SHD correcting sections 11 and 31 includes a correcting circuit 46 for carrying out the shading correction, or cancelling out the shading distortion on the digital image output, by dividing the digital image output by the shading correction data.

Each of the binary circuits 13 and 33 includes a binary slicing value register 42, and a comparing circuit 43 for monochrome judgment. The comparing circuit 43 compares the corrected digital image output (C) from the correcting circuit 46 with a level (D) which is a judgment reference prestored in the binary slicing value register 42. In short, the comparing circuit 43 carries out an operation of C-D as C+(-D) by means of an adder, after which each of the binary circuits 13 and 33 outputs a binary output based on the result of the adding operation (whether there is any value to be carried over or not).

Figure 5:
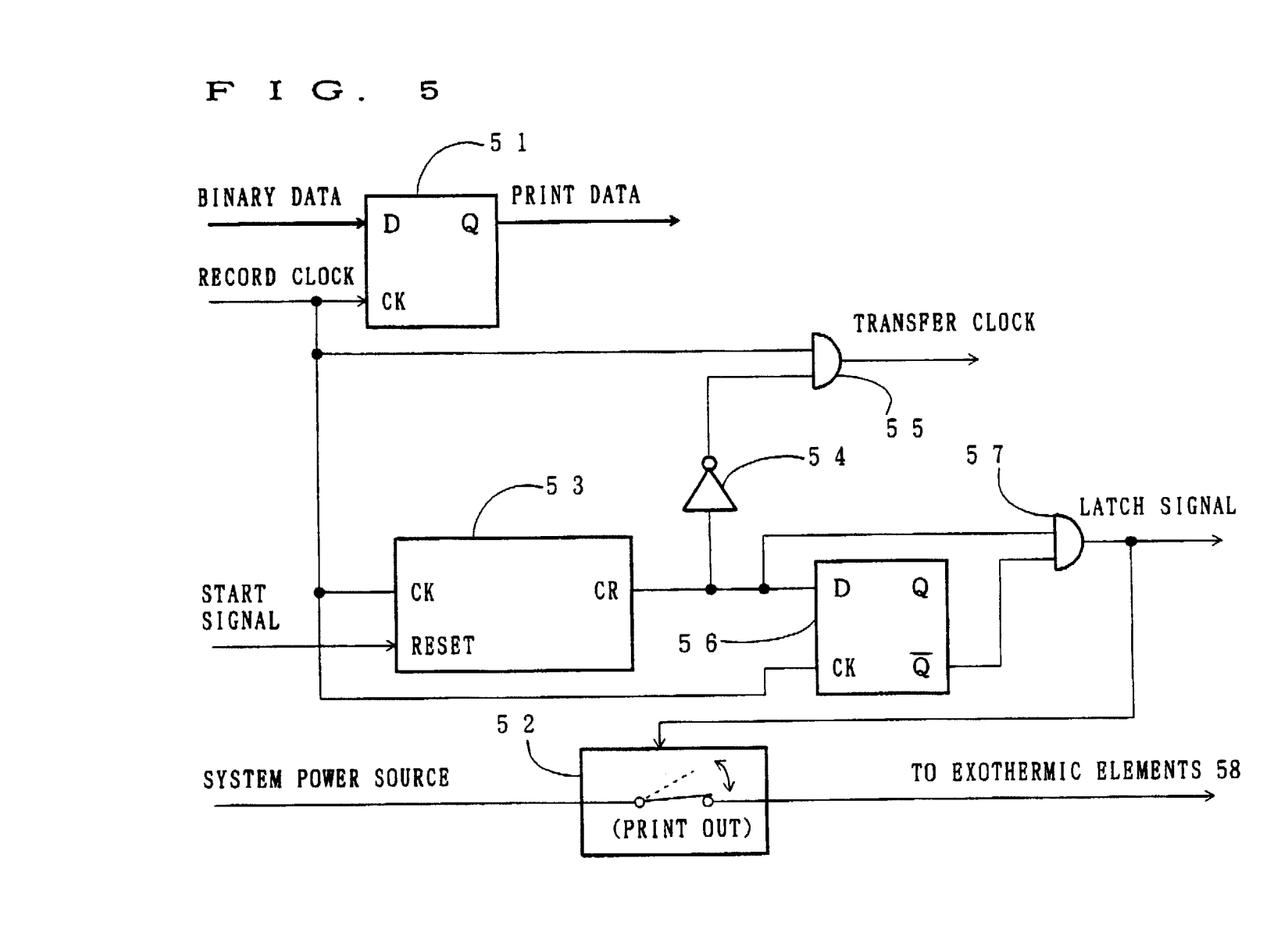
FIG. 5 is a block diagram depicting a driving section of an output section of the above image processing apparatus.
Figure 6:
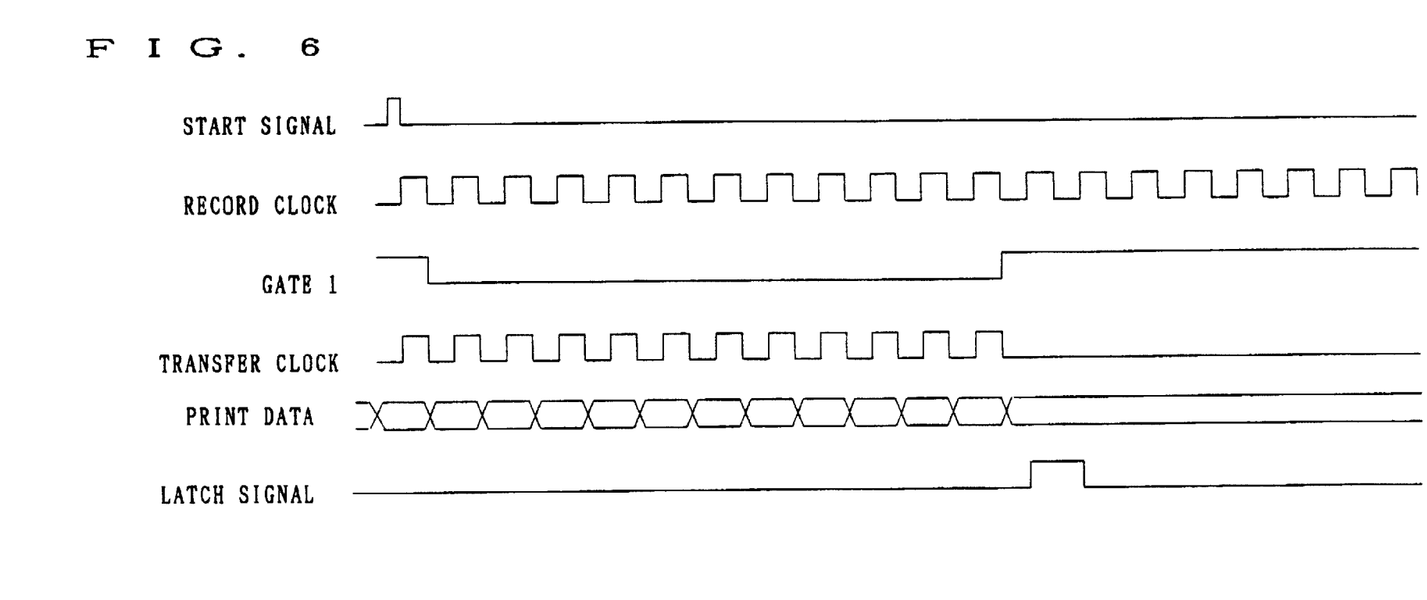
FIG. 6 is an operation timing chart of the above output section.

An example of the output section 15 of FIG. 1 is a driving section of a thermal printer. As shown in FIGS. 5 and 6, such a driving section includes a flip-flop 51 for transferring the post-monochrome-judgment binary image data from the binary circuit 13 as print data by latching and outputting the same in sync with a record clock.

The driving section includes, for example, a 10-bit counter 53, an inverter 54, and an AND gate 55 in accordance with a predetermined print width (2048 pixels in case of a Japanese standard B4-size paper) to generate a transfer clock for the thermal head.

The record clock and a start signal are inputted into the CK input and RESET input of the 10-bit counter 53, respectively. The CR output from the 10-bit counter 53, or an output signal (GATE 1), is inputted into either input of the AND gate 55 through the inverter 54. The record clock is also inputted into the other input of the AND gate 55. According to the above arrangement, the record clock is sent as a transfer clock only when the output signal (GATE 1) is "LO".

Further, the driving section includes a flip-flop 56 and an AND gate 57 to generate a latch signal for the thermal head. The CR output and record clock are inputted into the D input and CK input of the flip-flop 56, respectively. The $\overline{Q}$ output from the flip-flop 56 and the CR output from the 10-bit counter 53 are inputted into the two inputs of the AND gate 57, respectively.

Moreover, the driving section includes a head driving circuit 52 for controlling the ON/OFF action based on the latch signal of the voltage application to each exothermic element 58 of the thermal head, according to which the print data transferred to printing elements are printed out on a heat-sensitive recording paper.

Figure 7:
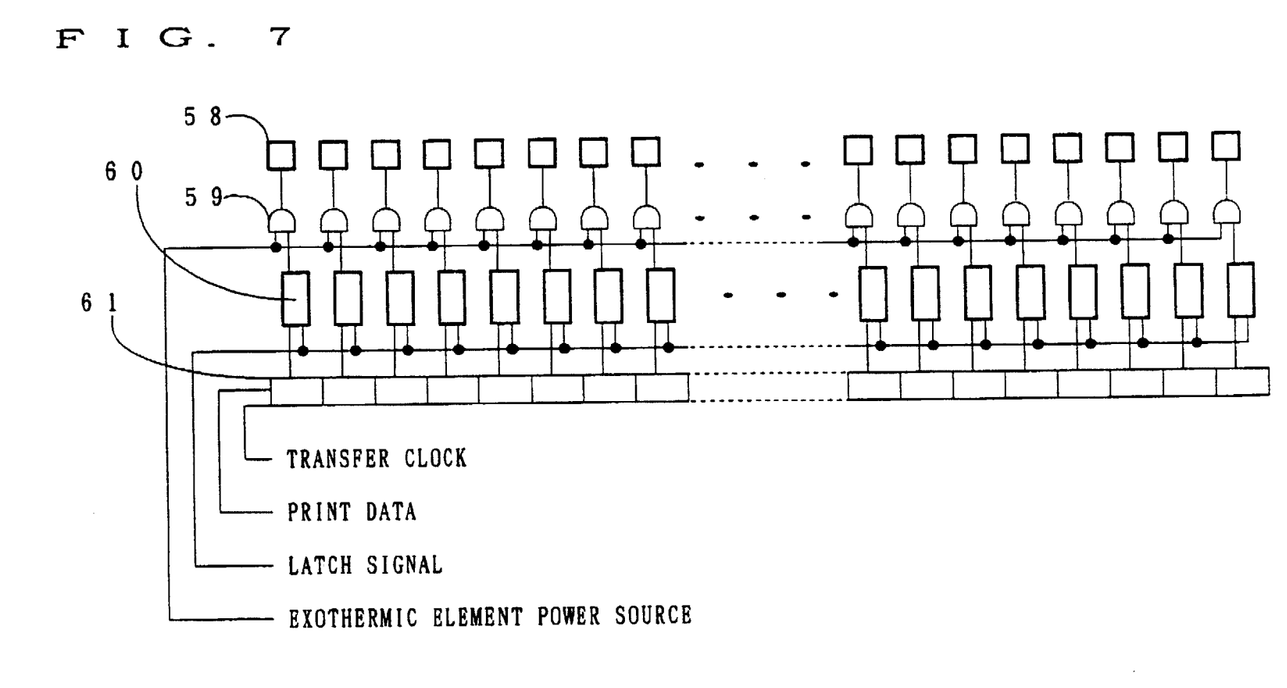
FIG. 7 is a view depicting a structure of a thermal head of the above output section.

As shown in FIG. 7, the thermal head includes an array of the exothermic elements 58 at a predetermined density (8 dot/mm in case of a facsimile machine), AND gates 59 for switching ON/OFF state of a power source to the exothermic elements 58 individually, registers 60 for setting the above ON/OFF state based on the latch signal, and shift registers 61 for sending a signal based on the print data to their respective registers 60 upon receipt of the print data.

The transfer clock and print data are transferred to the shift registers 61 inside the thermal head per bit from the driving section up to a predetermined number. Then, the print data in each shift register 61 are taken into their respective registers 60 by the latch signal outputted when the output signal (GATE 1) shifts to "HI".

Subsequently, the head driving circuit 52 drives the system power source of the exothermic elements 58 to stay ON for a predetermined time based on the latch signal. Accordingly, the exothermic elements 58 receive the print data in either 1's (black) and 0's (white), and only those having the register value of 1 start to generate heat and change the color of the photo-sensitive recording paper. The scanned image is printed out by repeating the above action per line.

Figure 8:
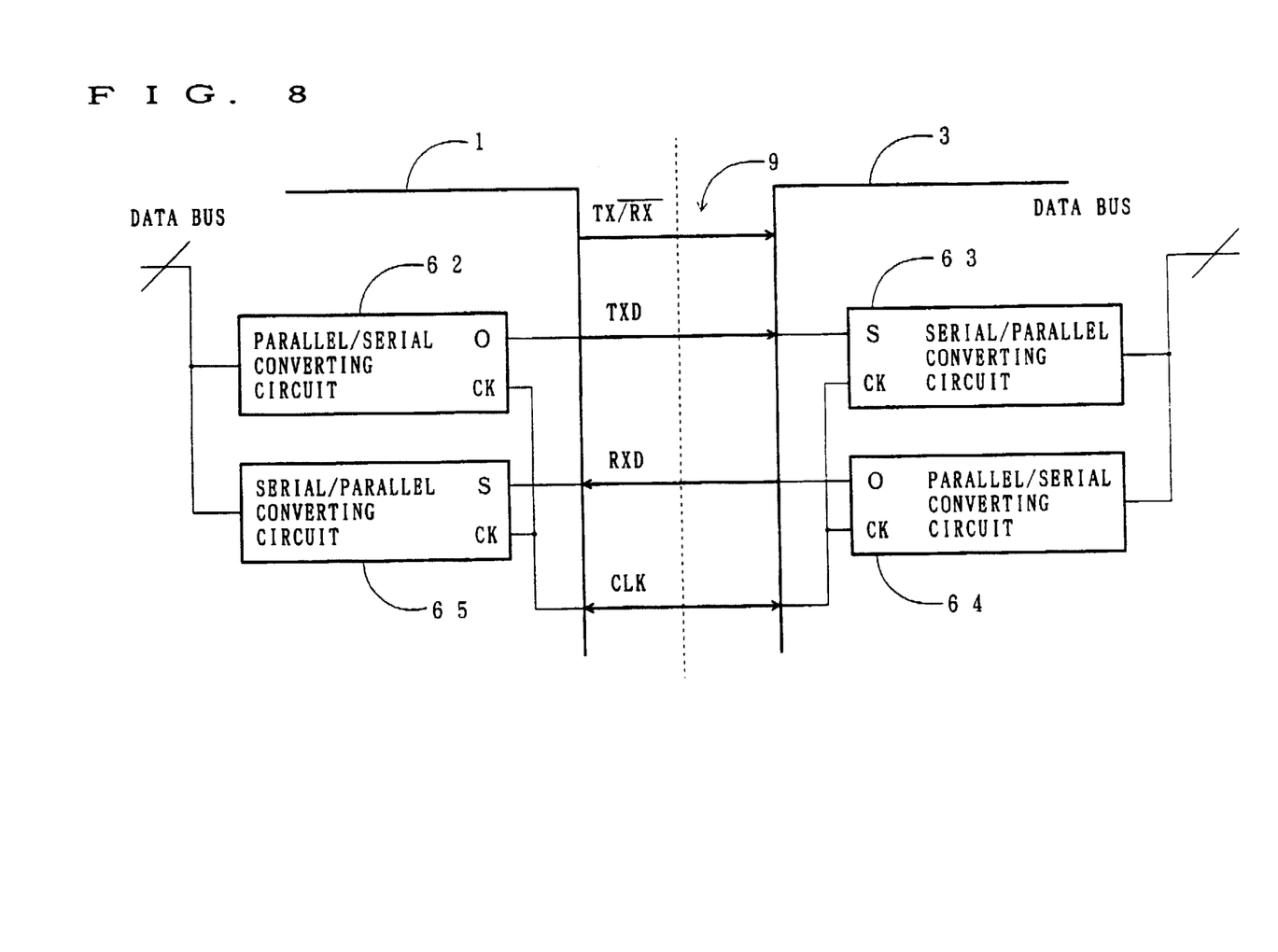
FIG. 8 is a block diagram depicting each I/F section of the above image processing apparatus.

As shown in FIG. 8, each of the I/F sections 16 and 36 is a two-way interface for transmitting image data, control signals and the like between the main body 1 and memory pack 3, and a clock synchronous serial interface is a good example.

The main body 1 notifies the memory pack 3 whether the transmission is inbound or outbound by transmitting a TX/RX signal through the I/F sections 16 and 36. In case of the outbound transmission, the control section 17 of the main body 1 sets the TX/RX signal to "HI" to shift the memory pack 3 to the receiving mode.

Then, the control section 17 of the main body 1 writes 1 byte of the data to be transmitted into a parallel/serial converting circuit 62. The parallel/serial converting circuit 62 steadily outputs eight IF clocks to a clock signal line (CLK) while outputting the data per bit to a TX signal line (TXD) in sync with the IF clocks.

Accordingly, a serial/parallel converting circuit 63 takes in the data from the TX signal line (TXD) per bit in sync with the IF clocks up to 8 bits. Then, the memory pack 3 takes into the 8-bit data as 1-byte data. The data are transmitted from the main body 1 to the memory pack 3 by repeating the above action.

On the other hand, in case of the inbound transmission, the control section 17 of the main body 1 sets the TX/RX signal to "LO" to shift the memory pack 3 to the sending mode. The memory pack 3 writes 1 byte of data to be transmitted into a parallel/serial converting circuit 64. Then, the parallel/serial converting circuit 64 steadily outputs eight IF clocks to the clock signal line (CLK) while outputting the data per bit to a RX signal line (RXD) in sync with the IF clocks.

Accordingly, a serial/parallel converting circuit 65 takes in the data from the RX signal line (RXD) per bit in sync with the IF clocks up to 8 bits. Then, the control section 17 of the main body 1 takes in the 8-bit data as 1-byte data. The data are transmitted from the memory pack 3 to the main body 1 by repeating the above action.

Next, the operation of the above-arranged image processing apparatus will be explained below.

According to the above structure, when the readout scanner 2 is attached to the main body 1, the readout scanner 2 converts the image into the image data, and the SHD correcting section 11 corrects the image data based on the first shading correction data stored in the memory 12. Subsequently, the resulting corrected image data are outputted to an external device from the output section 15. Note that the above operations are carried out under the control of the control section 17.

The control section 17 of the main body 1 measures the shading distortion by means of the readout scanner 2 and SHD correcting section 11 using the white board 8a as the reference document each time the readout scanner 2 is reattached to the main body 1 or the readout scanner 2 scans the document to a predetermined number of times.

Accordingly, the control section 17 replaces the current first shading correction data as to the readout scanner 2 with the result of the above measurement, in other words, the control section 17 updates the first shading correction data in the memory 12 every time the measurement is made.

Whereas when the readout scanner 2 is detached from the main body 1 together with the portable memory pack 3 and carried away from the main body 1, for example, to scan a document or map in another room, the readout image is converted into the image data and corrected by the SHD correcting section 31 based on the second shading correction data stored in the memory 32, and the corrected image data are stored in the image data memory 34.

Subsequently, the memory pack 3 is connected to the main body 1 through the communication cable 9 to send the image data in the image data memory 34 to the main body 1, so that the image data are outputted to an external device through the output section 15 of the main body 1.

As has been explained, the memory pack 3 and readout scanner 2 of the present image processing apparatus are portable; moreover, the readout scanner 2 is detachable from and attachable to the main body 1 and the memory pack 3, respectively. Thus, the present image processing apparatus can readily make a copy of an image on a document or the like regardless of the distance between the document and the main body 1.

Figure 9:
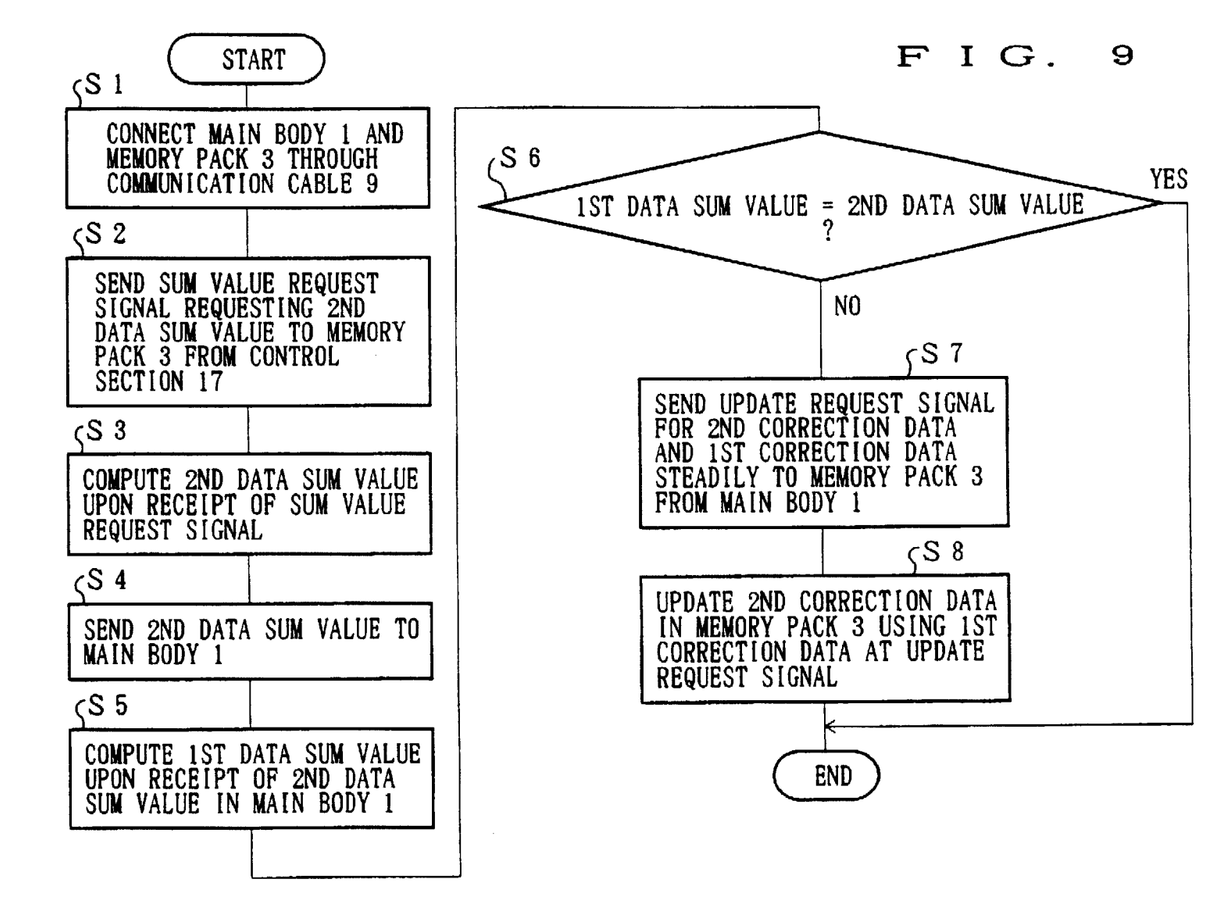
FIG. 9 is a flowchart detailing a procedure for updating second shading correction data in the above image processing apparatus.

Next, the operation as to the update of the second shading correction data in the memory pack 3 will be explained with reference to the flowchart of FIG. 9. To begin with, the main body 1 and memory pack 3 are connected to each other through the communication cable 9. Then, the control section 17 outputs a control signal to the memory pack 3 and confirms the connection therebetween upon receipt of an answering signal from the memory pack 3, which conveys the identification number of the memory pack 3 or the like (Step 1, herein after Step is abbreviated to S).

Next, the control section 17 outputs a sum value request signal to the memory pack 3 to direct the memory pack 3 to output the second data sum value of the second shading correction data in the memory 32 to the main body 1 (S2).

Upon receipt of the sum value request signal, the control section 37 of the memory pack 3 controls the sum value computing section 38 to compute the second data sum value of the second shading correction data (S3). Then, the control section 37 controls the sum value sending section 39 to output the second data sum value thus computed to the main body 1 (S4).

Upon receipt of the second data sum value, the control section 17 controls the sum value computing section 18 to compute the first data sum value of the first shading correction data in the memory 12 (S5) to enable the sum value comparing section 19 to compare the first data sum value and second data sum value from the memory pack 3 (S6).

When the two sum values match, the sum value comparing section 19 judges that the second shading correction data in the memory 32 and the first shading correction data in the memory 12 are identical; otherwise, the sum value comparing section 19 judges the first and second shading correction data are different.

The sum value comparing section 19 outputs the judgment result in the form of a signal, based on which and only when the two sum values do not match, the control section 17 outputs an update request signal to the memory pack 3, requesting to update the second shading correction data. At the same time, the control section 17 controls the corrected data transfer section 20 to steadily send the first shading correction data in the memory 12 to the memory pack 3 (S7).

After the memory pack 3 receives the first shading correction data, the control section 37 replaces the second shading correction data in the memory 32 with the newly received first shading correction data at the update request signal, so that the memory 32 stores the updated second shading correction data (S8).

As a result, the latest shading correction data as to the readout scanner 2 are stored in the memory pack 3 as the second shading correction data, so that the shading correction on the image data from the readout scanner 2 can be carried out in a reliable manner.

In the above arrangement, each time the main body 1 and memory pack 3 are connected to each other through the communication cable 9, the control section 17 of the main body 1 checks whether the shading correction data in the memory 32 of the memory pack 3 should be updated or not, and automatically transfers the shading correction data in the memory 12 to the memory pack 3 when the update is necessary.

According to the above arrangement, even when the memory pack 3 and readout scanner 2 are made portable to be more versatile, the memory pack 3 can carry out the shading correction faster and more easily while reducing its size by omitting members for shading correction, such as the measuring section and control section.

Further, the second shading correction data are updated only when the first and second shading correction data do not match, or are different. Thus, it has become possible to prevent a useless control to update the second shading correction data even when the first and second shading correction data match. As a result, when the main body 1 and memory pack 3 are connected each other, the two components can speed up the start-up operation, and hence the initial operation.

Furthermore, since the shading correction data can be as large as 2K bytes, the first data sum value and second data sum value are used when the first and second shading correction data are compared to avoid the transmission of the shading correction data per se having such a large volume. Therefore, less amount of data are transmitted for the comparing operation and the data transmission time for the update operation is reduced, thereby speeding up the update of the second shading correction data.

The entire second data sum value are sent to the main body 1 in the above arrangement. However, the entire second data sum value are not necessarily sent to the main body 1 as long as the matching of the first and second shading correction data can be checked. For example, only the last 2 bytes of the second shading correction data may be sent to be compared with the last 2 bytes of the first shading correction data. By so doing, an amount of data to be transmitted for the comparing operation is reduced further and the second shading correction data are updated faster compared with the case in the preceding paragraph.

In the above arrangement, while the readout scanner 2 is attached to the main body 1, the first shading correction data correcting the shading distortion caused by the readout scanner 2 are steadily updated in the main body 1. Thus, when the readout scanner 2 is detached from the main body 1 and the memory pack 3 is connected to the main body 1 through the communication cable 9, the second shading correction data in the memory pack 3 can be updated with the latest first shading correction data as to the readout scanner 2.

Thus, when the readout scanner 2 and the memory pack 3 connected thereto are carried away from the main body 1 to scan an image on a remote document or the like, the resulting image data are normalized, or standardized, for this particular readout scanner 2, and stored in the memory pack 3.

Therefore, when the memory pack 3 is compatible and connected to another main body 1, the connected main body 1 can output an image true to the image data, thereby making the readout scanner 2 and memory pack 3 more versatile.

In the above arrangement, the second shading correction data in the memory 32 are updated based on whether the first and second shading correction data are identical or not. However, the second shading correction data may be updated depending on how many times the first shading correction data are transferred to the memory pack 3 (hereinafter, referred to as the transfer times).

Figure 10:
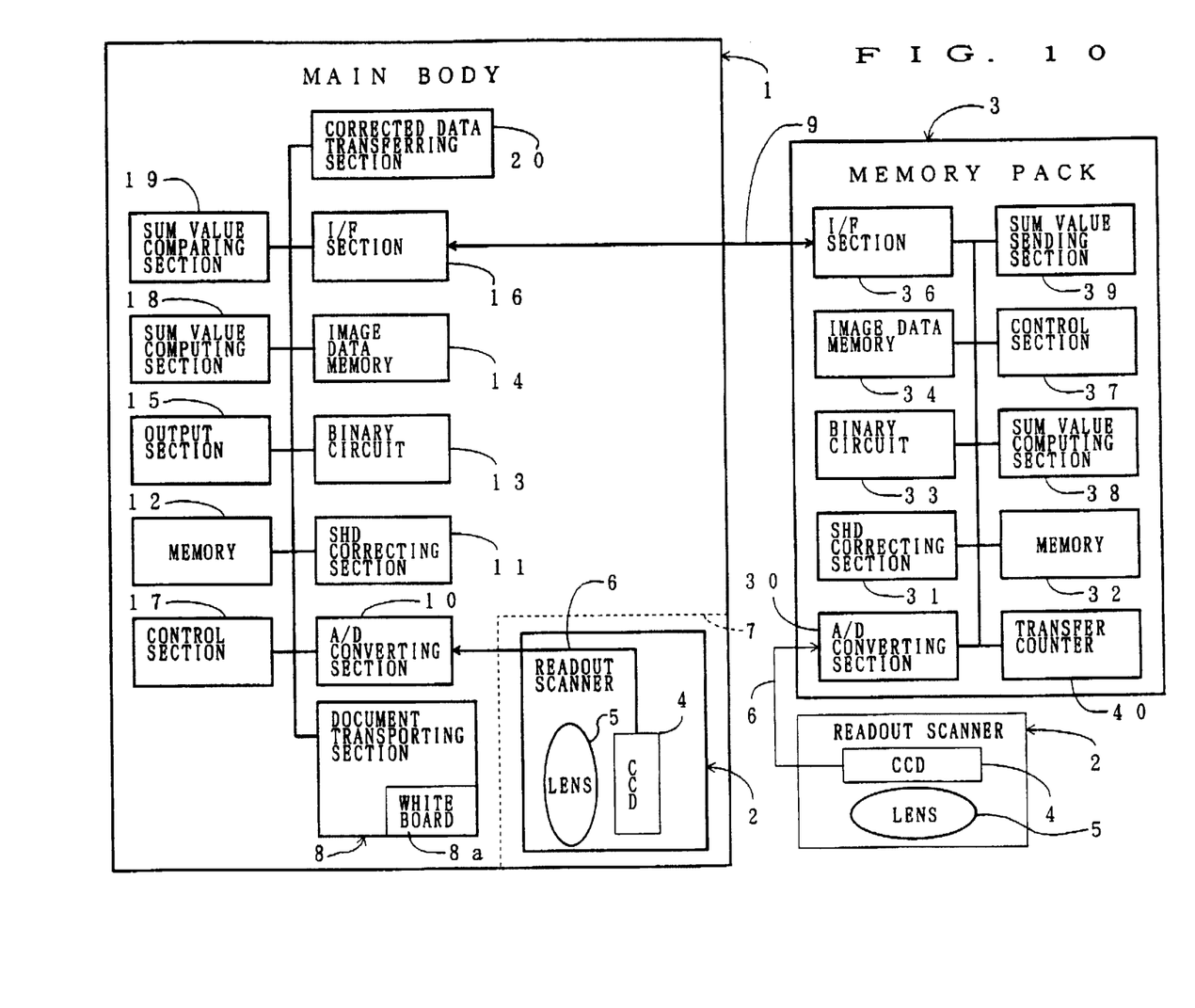
FIG. 10 is a block diagram depicting another example image processing apparatus of the present invention.

In this case, as shown in FIG. 10, the memory pack 3 additionally includes a transfer counter 40 for counting and storing the transfer times of the first shading correction data to the memory pack 3. Note that the transfer counter 40 also stores an identification code, such as an identification number, of a specific readout scanner 2 to which the memory pack 3 is attached. Hereinafter, like components are labeled with like reference numerals with respect to FIG. 1, and the description of these components is not repeated for the explanation's convenience.

The control section 17 of the main body 1 herein detects the transfer times and the identification code of the readout scanner 2 attached to the memory pack 3 stored in the transfer counter 40 when the memory pack 3 and main body 1 are connected to each other through the communication cable 9.

The control section 17 checks whether the first shading correction data as to the specific readout scanner 2 attached to the main body 1 have been transferred or not based on the transfer times and identification code, and when the checking result is in the negative, the control section 17 sends the first shading correction data to the memory pack 3 through the communication cable 9 to update the second shading correction data.

In other words, the control section 17 checks whether the second shading correction data should be updated or not for the specific readout scanner 2 based on the transfer times of the first shading correction data in the transfer counter 40. More specifically, when the transfer times is 1, the control section 17 judges the data transfer has been completed, and when the transfer times is 0, the control section 17 judges otherwise. When the control section 17 judges that the first shading correction have not been transferred yet, the control section 17 controls the main body 1 to output the first shading correction data to the memory pack 3 through the communication cable 9. Next, the control section 17 controls the memory pack 3 to replace the current second shading correction data with the newly provided first shading correction data, that is, update the second shading correction data.

The control section 17 sets the transfer times to 1 when the above data transmission ends to disallow the main body 1 to output the first shading correction data to the memory pack 3 through the communication cable 9 when the main body and memory pack 3 are reconnected to each other thereafter.

Thus, the present image processing apparatus arranged in the above manner can update the second shading correction data only when the first shading correction data have not been transferred to the memory pack 3 while reducing the memory pack 3 in size and weight by omitting members for the comparing operation. Thus, it has become possible to prevent a useless control to update the second shading correction data even when the first and second shading correction data match. As a result, when the main body 1 and memory pack 3 are connected each other, the two components can speed up the start-up operation.

Further, in the event that the first shading correction data are never updated once the same are inputted into the memory 12, for example, when the first shading correction data as to a specific readout scanner 2 attached to the main body 1 are installed in the memory 12 at the time of shipping, an amount of data to be transmitted between the main body 1 and memory pack 3 can be reduced.

To be more specific, the second shading correction data are updated only once when the main body 1 and the memory pack 3 are connected to each other for the first time by sending the first shading correction data to the memory pack 3. Thus, when the main body 1 and memory pack 3 are reconnected to each other thereafter, the control section 17 only has to check whether the update of the second shading correction data is necessary or not using the transfer times and the identification number of the readout scanner 2 in the counter 40, which are smaller in data amount than the first shading correction data. Thus, less amount of data are transmitted for the above checking operation.

Therefore, the above arrangement not only reduces the start-up time when the main body 1 and memory pack 3 are connected to each other, but also omits the white board 8a and the control program of the shading correction using the same, thereby making it possible to reduce the main body 1 both in size and weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:
a scanner for converting an image into image data;
a main body including a first memory, said scanner being attachable to and detachable from said main body, said first memory storing first shading correction data for correcting distortion of the image data from said scanner;
a portable memory pack including (1) a second memory for storing second shading correction data used to correct distortion of the image data from said scanner, (2) a correcting section for correcting distortion of the image data from said scanner based on the second shading correction data, and (3) a third memory for storing said corrected image data from said correcting section, said scanner being attachable to and detachable from said memory pack; and
control means for controlling said main body and said memory pack in such a manner that, when said main body and said memory pack are connected to each other, said main body sends the first shading correction data to said memory pack to update the second shading correction data using said first shading correction data.

2. The image processing apparatus as defined in claim 1, wherein said control means, when said main body and said memory pack are connected to each other, controls said main body and said memory pack in such a manner that said memory pack sends the second shading correction data to said main body to be compared with the first shading correction data, said second shading correction data being updated only when said first and second shading correction data are different from each other.

3. The image processing apparatus as defined in claim 1, wherein:
said main body includes a first computing section for computing a first data sum value by adding up the first shading correction data;
said memory pack includes a second computing section for computing a second data sum value by adding up the second shading correction data; and
said control means, when said main body and said memory pack are connected to each other, controls said main body and said memory pack in such a manner that said memory pack sends said second data sum value to said main body to be compared with said first data sum value, the second shading correction data being updated only when said first and second data sum values are different from each other.

4. The image processing apparatus as defined in claim 1 further comprising a transfer counter for counting and storing how many times the first shading correction data are transferred from said main body to said memory pack,
wherein said control means, when said main body and said memory pack are connected to each other, controls said main body and memory pack in such a manner that said main body sends the first shading correction data to said memory pack based on the number of transfer times to update the second shading correction data using said first shading correction data.

5. The image processing apparatus as defined in claim 1, wherein:
said main body further includes,
a white board used as a reference document, said white board opposing said scanner when said scanner is attached to said main body, and
a shading correcting section for measuring shading correction data based on image data obtained by said scanner through scanning of said white board; and
said control means, when said scanner is attached to said main body, controls said scanner to scan said white board to measure new first shading correction data by means of said shading correcting section to update the first shading correction data in said first memory.

6. The image processing apparatus as defined in claim 1, wherein:
said control means, when said main body and memory pack are connected to each other, controls said main body and said memory pack in such a manner that said memory pack outputs the image data from said third memory to said main body.

7. The image processing apparatus as defined in claim 1, wherein said main body further includes:
an additional correcting section for correcting distortion of the image data from said scanner based on the first shading correction data; and
an output section for outputting said corrected image data to an external device.

8. The image processing apparatus as defined in claim 1, wherein said main body further includes connecting means for, when said main body and said memory pack are connected to each other, transmitting data including the image data and a control signal between said main body and said memory pack.

9. The image processing apparatus as defined in claim 1, wherein said memory pack further includes connecting means for, when said memory pack and said main body are connected to each other, transmitting data including the image data and a control signal between said main body and said memory pack.

10. The image processing apparatus as defined in claim 1, wherein said control means is a microcomputer.

11. The image processing apparatus as defined in claim 1, wherein said scanner is not in communication with said main body when detached from said main body.

12. The image processing apparatus as defined in claim 8, wherein said connecting means is an interface section for converting parallel data into serial data.

13. The image processing apparatus as defined in claim 9, wherein said connecting means is an interface section for converting parallel data into serial data.

14. An image processing apparatus comprising:

a portable scanner for converting an image into image data;

a main body including a first memory, said scanner being attachable to and detachable from said main body and not being in communication with said main body when detached from said main body, said first memory storing first shading correction data for correcting distortion of the image data from said scanner;

a portable memory pack including a second memory for storing second shading correction data used to correct distortion of the image data from said scanner, (2) a correcting section for correcting distortion of the image data from said scanner based on the second shading correction data, and (3) a third memory for storing said corrected image data from said correcting section, said scanner being attachable to and detachable from said memory pack, said portable memory pack being connectable to and disconnectable from said main body, said scanner being attachable to and detachable from said memory pack, said second memory storing second shading correction data for correcting distortion of the image data from said scanner, and a control section for controlling said main body and said memory pack in such a manner that, when said main body and said memory pack are connected to each other, said main body sends the first shading correction data to said memory pack to update the second shading correction data using said first shading correction data.

15. The image processing apparatus as defined in claim 14, wherein said control section, when said main body and said memory pack are connected to each other, controls said main body and said memory pack in such a manner that said memory pack sends the second shading correction data to said main body to be compared with the first shading correction data, said second shading correction data being updated only when said first and second shading correction data are different from each other.

16. The image processing apparatus as defined in claims 14, wherein:

said main body includes a first computing section for computing a first data sum value by adding up the first shading correction data;

said memory pack includes a second computing section for computing a second data sum value by adding up the second shading correction data; and said control section, when said main body and said memory pack are connected to each other, controls said main body and said memory pack in such a manner that said memory pack sends said second data sum value to said main body to be compared with said first data sum value, the second shading correction data being updated only when said first and second data sum values are different from each other.

17. The image processing apparatus as defined in claim 14, further comprising a transfer counter for counting and storing how many times the first shading correction data are transferred from said main body to said memory pack, wherein said control section, when said main body and said memory pack are connected to each other, controls said main body and memory pack in such a manner that said main body sends the first shading correction data to said memory pack based on the number of transfer times to update the second shading correction data using said first shading correction data.

18. The image processing apparatus as defined in claim 14, wherein said control section is a microcomputer.

19. The image processing apparatus as defined in claim 14, wherein said main body further includes:

an additional correcting section for correcting distortion of the image data from said scanner based on the first shading correction data; and an output section for outputting said corrected image data to an external device.

\* \* \* \* \*